Feb. 28, 1956

F. C. GEBHART 2,736,575

BALL AND SOCKET TRAILER COUPLING WITH
CONNECTION FACILITATING MEANS

Filed May 19, 1953

INVENTOR
FLOYD C. GEBHART

BY *A. Yates Dowell*

ATTORNEY

United States Patent Office 2,736,575
Patented Feb. 28, 1956

2,736,575

BALL AND SOCKET TRAILER COUPLING WITH CONNECTION FACILITATING MEANS

Floyd C. Gebhart, Springport, Ind.

Application May 19, 1953, Serial No. 355,911

4 Claims. (Cl. 280—477)

This invention relates to a coupling for securing two relatively movable parts and particularly to a coupling used for connecting a tractor vehicle with a trailed vehicle.

It is well known that many types of couplings have been used for securing one vehicle to another, particularly in road vehicles where a tractor tows a conventional trailer. In the structures of the prior art the coupling of the vehicles has been a problem and a source of great annoyance since it has been essential to position the two vehicles at the exact location for the couplings to engage, and this has been extremely difficult particularly in house trailers and the like.

It is an object of the present invention to provide a coupling for use with road vehicles where it is unnecessary to accurately position the two vehicles to obtain the proper coupled relation.

Another object of the invention is to provide means for drawing two vehicles into proper position and to couple the vehicles for movement on a highway.

A further object is to provide a coupling structure which may be applied to existing vehicles without substantial alteration.

Another object of the invention is to provide a coupling means which makes it possible to safely couple two vehicles without danger to the person doing the coupling.

The coupling of the present invention involves a male member and a female member for mounting on separate vehicles and means on one of the vehicles for bringing the male and female members together without requiring other means for moving either of the vehicles.

Figure 1:
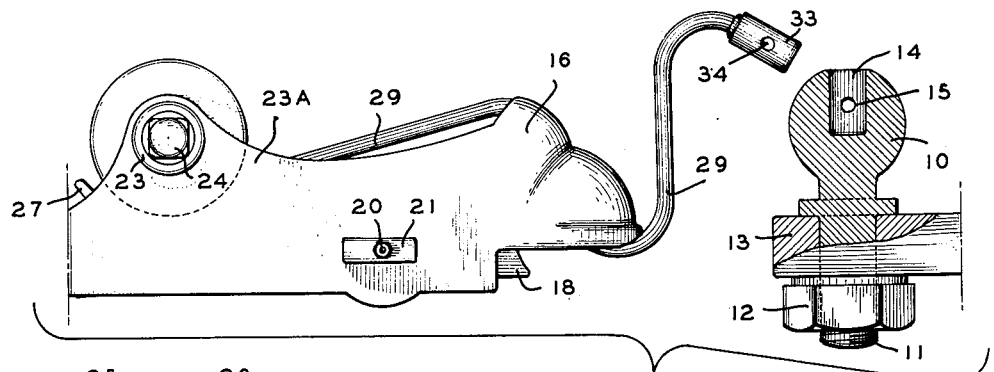
Figure 2:
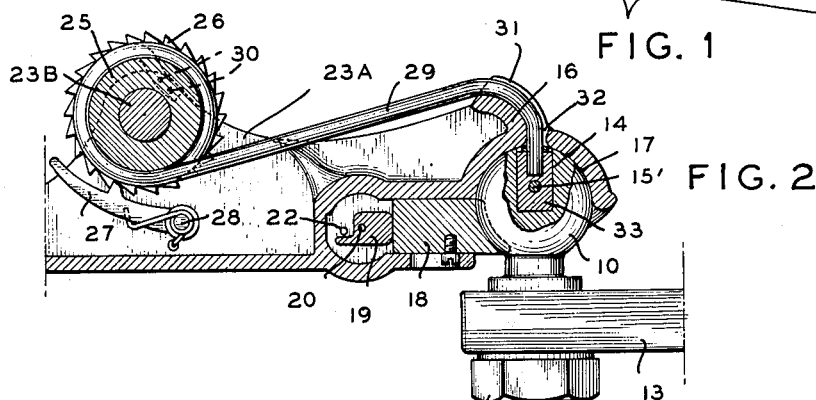
Figure 3:
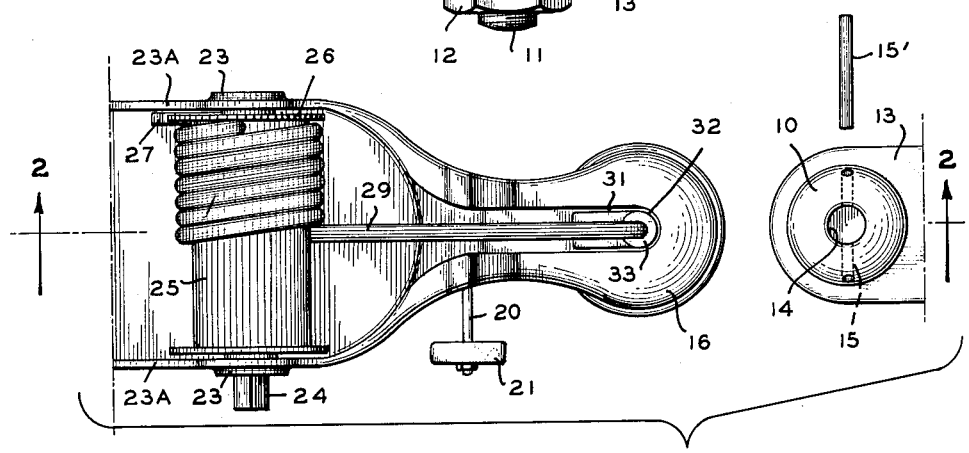

Further objects and advantages of the invention will be apparent when taken in conjunction with the accompanying drawing wherein:

Fig. 1 is an elevational view with parts in section of the male and female elements of the coupling before a connection is made;

Fig. 2, a partial section taken substantially on the line 2—2 of Fig. 3, but with the parts in assembled relation;

Fig. 3, a plan view of Fig. 1; and

Figure 4:
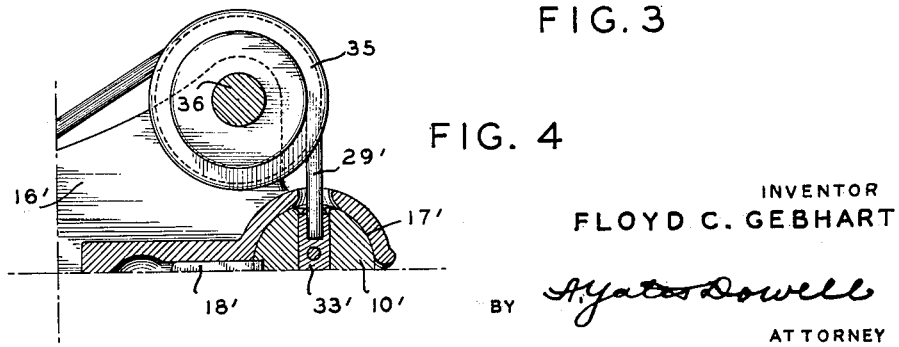

Fig. 4, a sectional view with parts broken away of a modified female coupling member.

Referring to Fig. 1, a ball 10 is supported in the usual manner on the tractor vehicle by means of the stud 11, secured by a nut 12 to a support 13 fixed on the tractor vehicle. A recess 14, which may be cylindrical or of other suitable shape, is formed in the ball and opens at the upper surface thereof. A transverse bore 15 is made in the ball 10 and intersects the recess 14 for receiving a locking pin 15' which is of a length less than the diameter of the ball. Upon the trailer draw bar is mounted the female member 16 which is provided with a socket 17 of a shape to receive the ball 10. A conventional locking slide 18 is slidably mounted in the female member 16 and is held in operative position by any suitable means such as a cam 19 on a rotatable shaft 20 which is turned for release by an operating key 21 or the like and a spring, not shown, may be provided for maintaining the cam in the position shown in Fig. 2, while a stop pin 22 may be provided for engagement with a lug on the cam 19 for limiting the movement thereof. Rotatably mounted in bearings 23 on webs 23A of the female member 16 is a shaft 23B having a projecting squared end 24 for operation by a crank, a wrench or the like. Fixed on the shaft 23 by means of a key or the like is a drum 25 provided with a ratchet 26 for cooperation with a spring pressed pawl 27 pivotally mounted at 28 on the web 23A of the female member. A cable 29 is secured at one end to the drum by any suitable means such as fastening elements 30 which may be screws or the like. The cable 29 is guided in a groove 31 which extends to and communicates with a downwardly flaring passage 32 and to the upper end of the socket 17. Fixed on the free end of the cable 29 is a plug 33 of a shape complementary to that of the recess 14 for snug reception thereby and a bore 34 through the plug 33 is aligned and cooperates with the bore 15 for receiving the pin 15' for securing the plug and the attached cable to the upper portion of the ball 10. The plug may be of polygonal shape if desired so the plug can only be located with its bore 34 in alignment with bore 15.

From the above it is believed that the operation of the coupling will be apparent and in use the vehicles are positioned in approximate coupling relation without regard to the exact locations thereof and the pawl 27 is released from the ratchet 26 permitting the cable 29 to be pulled out so that the plug 33 may be inserted into the recess 14 of the ball 10. The pin 15' is passed through the bore 15 in the ball and bore 34 through the plug locking the parts together. It will be noted that pin 15' does not project beyond the surface of the ball. A crank or the like is attached to the squared end 24 of the shaft 23 carrying the drum 25 and the cable 29 is wound thereon drawing the female member 16 by means of the cable 29 up and over the ball 10. At that time the operator makes sure that the slide 18 is in retracted position, permitting the male ball element to snugly engage the female socket 17 and the slide 18 is returned to its locking position as shown in Fig. 2 and the coupling operation is complete. The ratchet 26 and the cable 29 serve as a safety locking structure in the event of failure of the locking slide 18, since the taut cable 29 will maintain the ball and socket in operative relation. It will be evident that the cable may be of sufficient length to bring the vehicle together and if desired ten feet of cable may be used.

The modification shown in Fig. 4 is similar to that of the other figures but a grooved pulley wheel 35 is rotatably mounted on a shaft 36 supported on upstanding web portions of the female member 16' and this grooved pulley 35 replaces the groove 31 of the modification in Figs. 1 to 3, thereby reducing the friction on the cable. The ball 10' and socket 17' as well as locking slide 18' are similar to the corresponding elements in the first modification. The plug 33' and cable 29' cooperate in a similar manner with the male element and the drum for bringing the parts together.

From the above description it will be evident that applicant has provided a new and useful coupling structure with means for bringing the male and female cooperating elements together without danger of injury to the operator and with a minimum requirement of time and effort.

It will be obvious to those skilled in the art that various changes may be made in the invention without departing from the spirit and scope thereof and therefore this invention is not limited to that shown in the drawings nor to that described in the specification but only as indicated in the appended claims.

What is claimed is:

1. A trailer coupling comprising a ball fixedly supported from its bottom on a tractor vehicle, a cooperating trailer member provided with a downwardly opening socket adapted to receive and be supported on said ball, locking means on said member for engaging said ball for maintaining the ball and socket in assembled relation, a rotatable windlass mounted on said member, means for selectively preventing rotation of said windlass in one direction, a cable secured to said windlass for winding thereon, said cable extending through an opening at the top of said socket, guide means for said cable on said socket, said ball being provided with a recess extending downwardly from the upper surface thereof, plug means on the free end of said cable for insertion in said recess, means for detachably securing said plug means in said recess, a portion of the lower edge of said socket being smoothly rounded for slidable engagement with said cable, and means to operate said windlass for lifting and drawing said member up and onto said ball.

2. A coupling device for joining two relatively movable vehicles comprising a female element having a downwardly opening socket, said female element being provided with an opening into the upper portion of said socket for the passage of a cable, a portion of the lower edge of said socket being rounded for slidable engagement with said cable, a rotatable grooved pulley mounted on said female element so that a portion of the periphery thereof is substantially tangent to a cable passing through said opening, means on said female element for selectively drawing said cable or permitting the release thereof, a cooperating male element adapted to be secured to another vehicle, means for positively and releasably securing the end of the cable to said male element, said coupling device serving to couple two vehicles when the end of the cable is secured to the male element and the cable is drawn thereby lifting and drawing the female element up to and on to said male element.

3. A coupling for connecting trailer tractor vehicles comprising a ball for attachment to one of said vehicles and a socket open at its bottom for attachment to the other, means for mounting said ball in upright position so that when located in said socket the major portion of said ball supports said socket, a cable for drawing said ball and socket from uncoupled into coupled relation, a curved guide for said cable connected to the upper portion of said socket so that when the cable is pulled it will travel in a curved path over said guide, an opening in the top of said socket through which said cable extends, means for applying tension to said cable to produce coupling of the parts, means for attaching said cable to said ball, and locking means for securing said ball and socket in assembled relation, a portion of the lower edge of said socket being rounded for slidable engagement with said cable.

4. A coupling for connecting trailer tractor vehicles comprising a ball for attachment to one of said vehicles and a socket open at its bottom for attachment to the other, means for mounting said ball in upright position so that when located in said socket the major portion of said ball supports said socket, a cable for drawing said ball and socket from uncoupled into coupled relation, a curved guide for said cable connected to the upper portion of said socket so that when the cable is pulled it will travel in a curved path over said guide, an opening in the top of said socket through which said cable extends, means for applying tension to said cable to produce coupling of the parts, means for attaching said cable to said ball comprising a plug on the free end of said cable, said ball having a recess, and means for detaching and securing said plug in said recess, and locking means for securing said ball and socket in assembled relation, a portion of the lower edge of said socket being rounded for slidable engagement with said cable.

References Cited in the file of this patent

UNITED STATES PATENTS

| Number | Name | Date |
| --- | --- | --- |
| 1,398,575 | Ruggles | Nov. 29, 1921 |
| 1,924,235 | Fontaine | Aug. 29, 1933 |
| 2,150,010 | Solomon | Mar. 7, 1939 |
| 2,170,983 | Adams | Aug. 29, 1939 |
| 2,459,731 | Wymore | Jan. 18, 1949 |
| 2,475,780 | Fearnehough | July 12, 1949 |
| 2,481,898 | Bevan | Sept. 13, 1949 |